(12) United States Patent
Padmanabha Rao et al.

(10) Patent No.: US 7,711,807 B2
(45) Date of Patent: May 4, 2010

(54) SELECTIVE FILTERING OF EXCEPTION DATA UNITS

(75) Inventors: Hareesh M. Padmanabha Rao, Bangalore (IN); Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 11/690,571

(22) Filed: Mar. 23, 2007

(65) Prior Publication Data

US 2008/0028099 A1    Jan. 31, 2008

(30) Foreign Application Priority Data

Jul. 27, 2006    (IN)    .................... 1725/DEL/2006

(51) Int. Cl.
*G06F 15/173*    (2006.01)
*G06F 15/177*    (2006.01)
*G06F 15/16*    (2006.01)

(52) U.S. Cl. .................. 709/223; 707/200; 712/244; 711/103; 719/310

(58) Field of Classification Search ......... 709/217–228; 707/200; 712/244; 711/103; 719/310
See application file for complete search history.

(56) References Cited

U.S. PATENT DOCUMENTS

| 6,345,280 | B1 * | 2/2002 | Clark et al. | 707/200 |
|---|---|---|---|---|
| 7,386,655 | B2 * | 6/2008 | Gorobets et al. | 711/103 |
| 7,536,694 | B2 * | 5/2009 | Blinick et al. | 719/310 |
| 2004/0098496 | A1 * | 5/2004 | Wolrich et al. | 709/230 |
| 2006/0149952 | A1 * | 7/2006 | Blinick et al. | 712/244 |

* cited by examiner

*Primary Examiner*—Haresh N Patel
(74) *Attorney, Agent, or Firm*—Blakely, Sokoloff, Taylor & Zafman LLP

(57) ABSTRACT

A network device to selectively filter the exception data units based on the type of the exception data units. The network device generates a first threshold value for a first type of exception data units and a second threshold value for a second type of exception data units. The first threshold value and the second threshold value are determined based on the weight factors associated with each the first type and the second type of exception data units and a scratch pad threshold value. The network data unit determines the type of exception data units and a scratch pad fullness value and filters the first type and the second type of exception data units based on the first and the second threshold values.

20 Claims, 3 Drawing Sheets

SELECTIVE FILTERING OF EXCEPTION DATA UNITS

CROSS REFERENCES TO RELATED APPLICATION

This application claims foreign priority to Indian Application Number 1725/DEL/2006 filed Jul. 27, 2006.

BACKGROUND

A computer network generally refers to a group of interconnected wired and/or wireless network devices such as, for example, laptops, mobile phones, servers, fax machines, and printers. The network devices may transfer data units from one network device to another network device. A network device such as a router may comprise a network processor, which may be designed to process the data units.

The network processor may comprise a first set of processing resources and a second set of processing resources which may be, respectively, referred to as a regular processing path and a specialized processing path. The network processor may process the data units using a first set of processing resources if the data units can be processed within a pre-determined period such as a cycle budget. The pre-determined period may be determined such that the data units may be processed to maintain the line rate of arrival of the data units. However, some data units may require more processing time than the pre-determined period and may be sent as an exception to a second set of processing resources.

The network processor may comprise a memory such as a scratch memory, between the regular and specialized processing path, to store the exception data units before the specialized processing path processes the exception data units. However, the exception data units arriving after the scratch memory is full may be filtered or dropped indiscriminately. For example, dropping the exception data units such as address resolution protocol (ARP) packets may result in a delay in arriving at a stable network state. It may be desirable to avoid or reduce such indiscriminate filtering of the exception data units.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a system and a network device that may selectively filter the exception data units, for example, received over a network path. In the following description, numerous specific details such as logic implementations, resource partitioning, sharing, and duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more network processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, network processors, controllers, or other devices executing the firmware, software, routines, instructions, etc.

Figure 1:
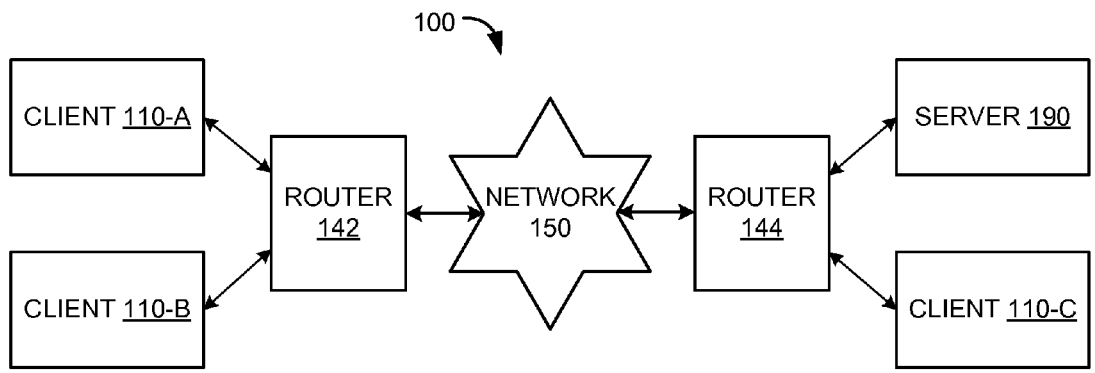
FIG. 1 illustrates an embodiment of a network environment.

An embodiment of a network environment 100 is illustrated in FIG. 1. The network environment 100 may comprise one or more clients such as a client 110-A, 110-B, and 110-C, a router 142 and a router 144, a network 150, and a server 190.

The client 110 may comprise a desktop computer system, a laptop computer system, a personal digital assistant, a mobile phone, or any such computing system. In one embodiment, the client 110-A may generate one or more type of data units such as, for example, address resolution protocol (ARP) data units, internet control message protocol (ICMP) data units, ping data units, and IP data units. In one embodiment, the client 110-A may send the data units to the server 190 or another client such as the client 110-C. In one embodiment, the client 110-A and 110-B may be coupled to a network device such as the router 142 and the client 110-C may be coupled to the router 144 via a local area network (LAN). The client 110 may, for example, support protocols such as hyper text transfer protocol (HTTP), file transfer protocols (FTP), and TCP/IP.

The server 190 may comprise a computer system capable of receiving the data units from the router 144 and sending responses to destination system via the router 144. In one embodiment, the server 190 may support various databases, which may support, for example, billing, quality of service, and security applications. The server 190 may comprise, for example, a web server, a transaction server, a database server, and such other servers.

The network 150 may comprise network devices such as a switch or a router, which may receive the data units, process the data units, and send the data units to an appropriate network device. The network 150 may enable transfer of data units between the client 110 and the server 190. The network devices of the network 150 may be configured to support various protocols such as TCP/IP.

The routers 142 and 144 may transfer of the data units between the client 110 and the server 190 via the network 150. In one embodiment, the router 142 may receive the data units from the client 110-A, process the data units before sending the data units to the network 150. In one embodiment, the router 142 may determine the data units that may be sent as an exception and selectively filter the exception data units before sending a fraction of the exception data units to the specialized processing path.

Figure 2:
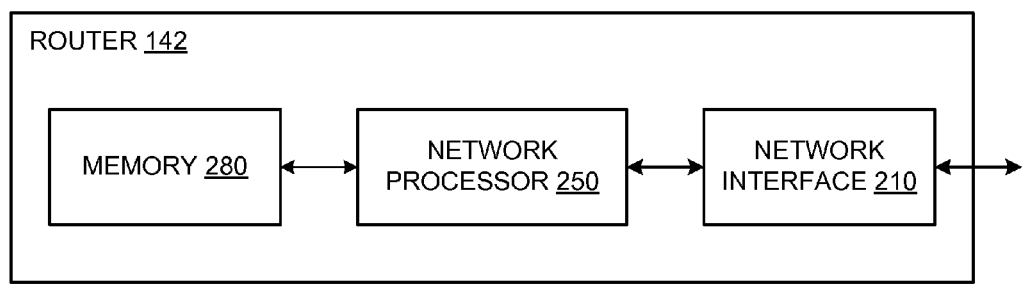
FIG. 2 illustrates an embodiment of a network device of FIG. 1

An embodiment of the router 142 is illustrated in FIG. 2. The router 142 may comprise a network interface 210, a network processor 250, and a memory 280.

The network interface 210 may transfer one or more data units between the router 142 and other network devices. For example, the network interface 210 may receive the data units from the client 110-A and send the data units to the network processor 250 for further processing. Also, the network interface 210 may receive the data units from the network processor 250 and send it to an adjacent network device for further processing. The network interface 210 may provide physical, electrical, and protocol interfaces to transfer the data units between the client 110 and the network 150.

The memory 280 may store information that may be accessed by the network processor 250. In one embodiment, the memory 280 may store the data units and related data that may be used by the network processor 250. In one embodiment, the memory 280 may store the data units, configuration values, configuration tables, data structures and such other parameters that may be used by the network processor 250. In one embodiment, the memory 280 may comprise a dynamic random access memory (DRAM) and a static random access memory (SRAM).

The network processor 250 may receive the data units from the network interface 210, process the data units, and send the data units to the network interface 210. In one embodiment, the network processor 250 may selectively filter the exception data units, perform header processing, perform packet validation and IP lookup, and determine the output port and such other processing before sending the data units to the network interface 210. In one embodiment, the network processor 250 may comprise Intel® IXP2400 network processor.

In one embodiment, the network processor 250 may receive the data units, determine which of the data units may be sent as an exception, and transfer the exception data units based on selective filtering. In one embodiment, the network processor 250 may receive data units, for example, of a first type, a second type and a third type representing ARP, ICMP, and ping data units respectively. In one embodiment, the network processor 250 may selectively filter the first, second, and the third type of exception data units, for example, by dropping 1, 3, and 5 data units respectively. The remaining data units i.e., 9, 7, and 5 of the first, the second, and the third type may be transferred to the specialized processing path.

Figure 3:
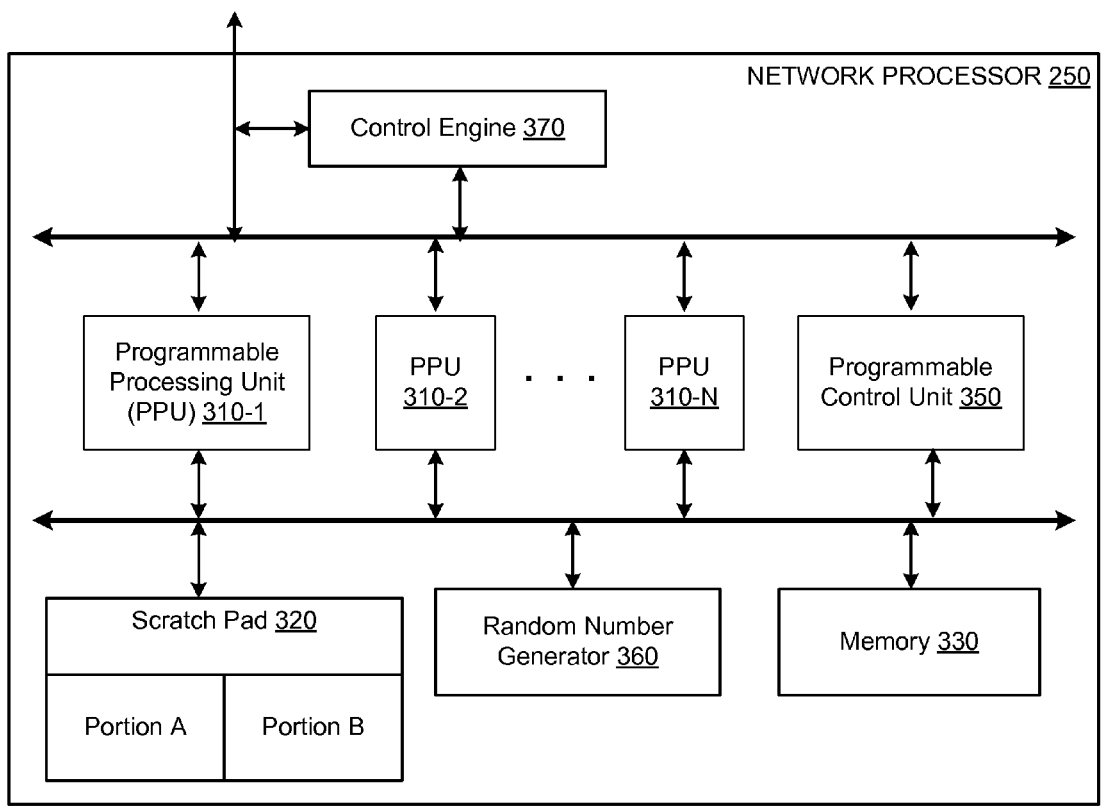
FIG. 3 illustrates an embodiment of a network processor of the network device.

An embodiment of the network processor 250 is illustrated in FIG. 3. The network processor 250 may comprise programmable processing units (PPUs) 310-1 to 310-N, a scratch pad 320, a memory 330, a programmable control unit 350, a random number generator 360, and a control engine 370.

The memory 330 may store the data units, configuration tables and such other values that may be used by the programmable processing units 310 and the programmable control unit 350. In one embodiment, the memory 330 may comprise a dynamic random access memory (DRAM) and a static random access memory (SRAM).

The control engine 370 may configure the network processor 250, initiate applications, terminate applications and perform such other management functions. The control engine 370 may support user interfaces such as a graphical user interface (GUI) for receiving and displaying information from a user. In one embodiment, the control engine 370 may receive one or more configuration values and a scratch pad threshold value (ST) that may be provided by, for example, a network administrator.

In one embodiment, the configuration values may represent the priorities and weight factors associated with each type of data units. In one embodiment, the priorities may represent the relative importance associated with each type of data units. The weight factors may represent the degree by which each type of exception data units may be dropped or allowed. In one embodiment, the scratch pad threshold value may represent a level in the scratch pad 320 beyond which the exception data units may be filtered based on the threshold values.

The random number generator 360 may generate random numbers, for example, between 0 and 1. In one embodiment, the random number generator 360, may generate a random number in response to receiving a generate signal from the programmable processing units. In one embodiment, the random number generator 360 may generate a uniformly distributed random numbers.

The scratch pad 320 may comprise several memory locations and the memory locations may, for example, be grouped into a first portion A and a second portion B. The memory locations in the first portion A may be used by the programmable processing units 310 to share information between themselves. In one embodiment, the first portion A of the scratch pad 320 may store, for example, a buffer handler of a data unit in a pre-specified memory location that may be exchanged between two programmable processing units. In one embodiment, the first portion A of the scratch pad 320 may store information corresponding to a data unit $D_x$, in a memory location $L_{xyz}$, wherein x represents the data unit identifier, y represents the sinking programmable processing unit and z represents the sourcing programmable processing unit.

The second portion B of the scratch pad 320 may comprise one or more memory locations that may be used by the programmable processing units 310 to store the exception data units. For example, the second portion B of the scratch pad 320 may store, for example, only M exception data units received form the programmable processing units 310. The second portion B, of the scratch pad 320, after storing M data units may not have capability to store the exception data units that arrive next. The size of the scratch pad 320 may be fixed and increasing the size of the scratch pad 320 may be cost prohibitive.

The programmable control unit 350 may handle protocol messages, configure and update tables and data sets that may be used by the programmable processing units 310-1 to 310-N. In one embodiment, the programmable control unit 350 may support the specialized processing path. In one embodiment, the programmable processing unit 350 may comprise processing resources such as XScale® core. In one embodiment, the programmable control unit 350 may retrieve the exception data units from the second portion B of the scratch pad 320 and process the exception data units.

In one embodiment, the programmable control unit 350 may determine the threshold values, which correspond to each type of data units based on the configuration values and the scratch pad threshold (ST) value. In one embodiment, the programmable control unit 350 may generate a first threshold value, a second threshold value, and a third threshold value, which correspond to the first type, the second type, and the third type of exception data units respectively. In one embodiment, the first threshold value, the second threshold value, and the third threshold value may indicate the proportion of the first type, the second type, and the third type data units that may be stored in the second portion B of the scratch pad 320. In other embodiment, the first threshold value, the second threshold value, and the third threshold value may indicate the proportion of the first type, the second type, and the third type data units that may be filtered or stopped from reaching the second portion B of the scratch pad 320.

In one embodiment, the programmable control unit 350 may receive the configuration values and the scratch pad threshold (ST) value, which may be provided, for example, by a designer of the network. In one embodiment, the programmable control unit 350 may generate the threshold values such as the first threshold value, the second threshold value, and the third threshold value based on the first, the second, and the third weight factors and the scratch pad threshold value (ST). In one embodiment, the configuration values such as the priorities and the weight factors associated with each type of the exception data units and the scratch pad threshold value ST may be changed dynamically based on the network condition. In one embodiment, the programmable control unit 350 may, dynamically, change the configuration values and the scratch pad threshold value ST based on, for example, whether the network device is in the start-up phase, or stabilized phase, or based on the network condition.

The programmable processing units 310-1 to 310-N may process the data units received form, for example, an adjacent network device. In one embodiment, the programmable processing units 310 may support the regular processing path. Each programmable processing unit 310-1 to 310-N may comprise one or more sub-programmable processing units, which may process data units in parallel, for example, to maintain the line rate of arrival of the data units. A group of sub-programmable processing units may perform a logical function, which may be referred to as a logic block. In one embodiment, the sub-programmable processing units 310 may exchange data using the first portion A of the scratch pad 320. The programmable processing units 310-1 to 310-N may support logic blocks and each logic block may perform a sub-task to, collectively, complete a task.

In one embodiment, the programmable processing units 310-1 to 310-N may receive a data unit and determine whether the data units can be processed within the pre-determined period or the cycle budget. In one embodiment, the programmable processing units 310 may process the data units, in the regular processing path, that may be processed within the pre-determined period. In one embodiment, the programmable processing units 310 may identify the data units, which may require a time period greater than the pre-determined period to be processed and may identify such data units as the exception data units. In one embodiment, the programmable processing units 310 may selectively filter the exception data units based on the proportion of the threshold values of the type of data units.

In one embodiment, the programmable processing units 310 may determine a scratch pad fullness value (SF) based on the quantity of data units stored in the second portion B of the scratch pad 320. In one embodiment, the programmable processing units 310 may compare the scratch pad fullness value SF with the scratch pad threshold value (ST). In one embodiment, the programmable processing units 310 may store all the exception data units in the scratch pad 320 if the scratch pad fullness value SF is less than the scratch pad threshold value ST.

In one embodiment, the programmable processing units 310 may send a generate signal to the random number generator 360 if the scratch pad fullness value SF is equal to or greater than the scratch pad threshold value ST. The programmable processing unit 310 may selectively filter the data unit based on the comparison between the random number and the threshold value of the type of the exception data unit.

For example, if the data unit is of ARP type and if the random number is less than the first threshold value, the programmable processing unit 310 may store the ARP type data unit in the second portion B of the scratch pad 320 and may drop or may merely not store the ARP type data unit otherwise. Likewise the ICMP type data units may be either stored into the scratch pad 320 or dropped based on the comparison of a random number and the second threshold.

In one embodiment, the data units of each type are either stored into the scratch pad 320 or dropped based on the threshold values. In other words, the data units of each type are either allowed or dropped in a proportion based on the threshold values. Such an approach may avoid some type of data units to be dropped, indiscriminately, due to their time of arrival.

Figures 4, 5:
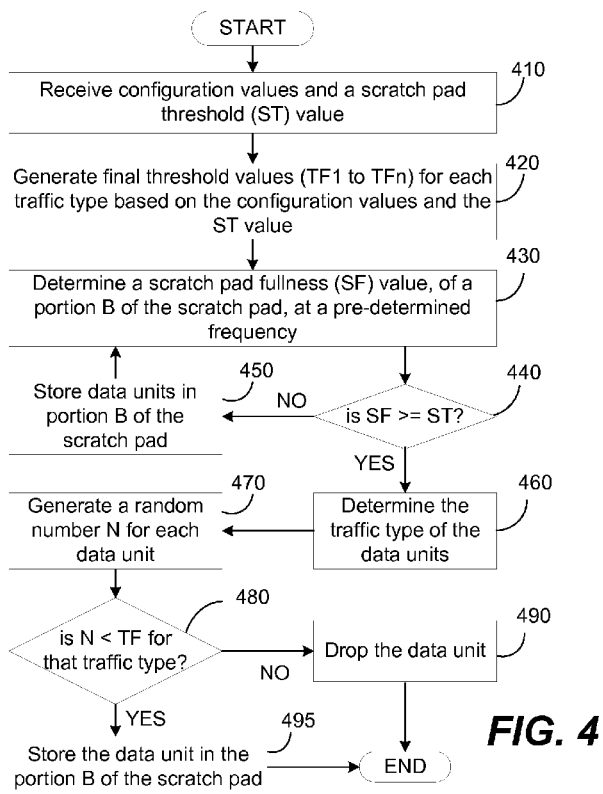
FIG. 4 depicts a flow-chart that illustrates an operation of the network processor 250 to selectively filter the exception data units.
FIG. 5 depicts a configuration table comprising values that may be generated by the network processor 250 that may be used to selectively filter the exception data units.

An embodiment of the network processor 250 that selectively filters the exception data units is depicted in the flow chart of FIG. 4. In block 410, the programmable control unit 350 may receive the configuration values and the scratch pad threshold value (ST). In one embodiment, the configuration values may represent the priorities associated with each traffic type and the weight factors W1, W2, . . . Wn associated with each traffic type. For example, a first traffic type, a second traffic type, and a third traffic type of data units may be configured to have priorities P3, P2, and P1, and weight factors such as first weight factor W1=0.2, a second weight factor W2=0.6, and a third weight factor W3=0.8 respectively.

In one embodiment, W1, W2, and W3 may determine a degree by which the first type, the second type, and the third type of exception data unit is filtered from reaching the scratch pad 320. The scratch pad threshold value represents a level of the scratch pad 320, beyond which the plurality of programmable processing units filter the first type, the second type, and the third type of exception data units.

In block 420, the programmable control unit 350 may generate the threshold values T for each type of exception data units based on the configuration values and the scratch pad threshold values. The programmable control unit 350 may, for example, generate threshold values T1, T2, and T3 for the first, second, and the third traffic type respectively. In one embodiment, the threshold value T for a given type of exception data unit may be computed as $\{1-(ST \times \text{weight factor of that traffic type})\}$.

In one embodiment, the programmable control unit 350 may generate a configuration table 500, depicted in FIG. 5. For example, the scratch pad threshold value ST may equal 50% or 0.5. The scratch pad threshold value of 0.5 may indicate that the exception data units may be selectively filtered if the scratch pad fullness is equal to or greater than 50%. The configuration table 500 may comprise the traffic type 501, the configuration values 504, and the threshold values 508. The row 510 is shown comprising ARP, P3, 0.2 and 0.9 representing the traffic type, the priority value, the weight factor, and the threshold value for ARP type exception data units. Likewise, the row 520 is shown comprising ICMP, P2, 0.6, and 0.70 representing the traffic type, the priority value, the weight factor, and the threshold value for ICMP type exception data units. The row 530 is shown comprising Ping, P1, 0.8, and 0.60 representing the traffic type, the priority value, the weight factor, and the threshold value for ping type exception data units.

In block 430, the programmable processing units 310 may determine the scratch pad fullness value SF of the portion B of the scratch pad 320 at a pre-determined frequency or at pre-determined intervals. In one embodiment, the programmable processing units 310 may poll the second portion B of the scratch pad 320 at the pre-determined frequency and determine the degree of fullness of the second portion B of the scratch pad 320.

In block 440, the programmable processing unit 310 may determine if the scratch pad fullness value SF is greater or equal to the scratch pad threshold value ST and control passes to block 460 if the condition is true and to block 450 otherwise.

In block 450, the programmable processing unit 310 may store the exception data units in portion B of the scratch pad 320 and control passes to block 430.

In block 460, the programmable processing unit 310 may determine the type of the exception data unit. In one embodiment, the programmable processing unit 310 may examine a type filed in the data unit to determine the type of the exception data unit. For example, the programmable processing unit 310 may determine that the type of the exception data unit as ARP, or ICMP, or ping.

In block 470, the programmable processing unit 310 may receive a random number N in response to sending the generate signal to the random number generator 360. For example, the programmable processing unit 310 may receive a random number equaling 0.8.

In block 480, the programmable processing unit 310 may compare the random number N with the threshold value of the traffic type of the exception data unit stored in the configuration table 500. The programmable processing unit 310 may cause control to pass to block 495 if the random number N is less than the threshold value and to block 490 otherwise. As the random number N (=0.8) is greater than the threshold value T2=0.7 of ICMP traffic type exception data unit, the programmable processing unit 310 causes control to pass to block 490.

In block 490, the programmable processing unit 310 may filter or drop the exception data unit. In other words, the programmable processing unit 310 may not store the exception data unit in the portion B of the scratch pad 320. In the above example, the ICMP exception data unit may be dropped.

In block 495, the programmable processing unit 310 may store the exception data unit in the portion B of the scratch pad 320. Thus, the network processor 250 selectively filters the exception data units.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A network processor comprising:
a scratch pad coupled to a plurality of programmable units; and
a programmable control unit coupled to the scratch pad and the plurality of programmable units, wherein the control unit is to generate a first threshold value for a first type of exception data unit and a second threshold value for a second type of exception data unit,
wherein the first threshold value and the second threshold value are determined based on respective weight factors of the first type and the second type of exception data units and a scratch pad threshold value,
wherein the plurality of programmable processing units is to filter the first type of exception data units to store a first proportion of the first type of exception data units in the scratch pad based on the first threshold value and filter the second type of exception data units to store a second proportion of the second type of exception data units in the scratch pad based on the second threshold value, wherein the programmable control unit is to determine a scratch pad fullness value based on the second proportion,
wherein the second proportion is greater than the first proportion and the second type of exception data units are of higher priority compared to the first type of exception data units,
wherein the scratch pad is provisioned to selectively allow the first and the second type of exception data units from a regular processing path to a specialized processing path of the network processor.

2. The network processor of claim 1, wherein the first threshold value is generated based on the first weight factor and a scratch pad threshold value.

3. The network processor of claim 2, wherein the programmable processing units
determine whether a first data unit is the first type,
compare the scratch pad fullness value with the scratch pad threshold,
receive a first random number if the scratch pad fullness is greater than or equal to the scratch pad threshold,
filter the first data unit if the first random number is greater than the first threshold value, and
store the first data unit in the scratch pad if the first random number is not greater than the first threshold value.

4. The network processor of claim 3 further comprises a random number generator to generate the first random number in response to receiving the first signal.

5. A method in a network processor comprising:
generating a first threshold value for a first type of exception data unit;
generating a second threshold value for a second type of exception data unit;
storing a first proportion of the first type of exception data units in the scratch pad, wherein the first proportion of the first type of exception data units stored is based on the first threshold value,
storing a second proportion of the second type of exception data units in the scratch pad, wherein the second proportion of the second type of exception data unit stored is based on the second threshold value; and determining a scratch pad fullness value based on the second proportion;

wherein the first threshold value and the second threshold value are determined based on respective weight factors of the first type and the second type of exception data units and a scratch pad threshold value, wherein the second proportion is greater than the first proportion and the second type of exception data units are of higher priority compared to the first type of exception data units, wherein the scratch pad is provisioned to selectively allow the first and the second type of exception data units from a regular processing path to a specialized processing path of the network processor.

6. The method of claim 5, wherein the first threshold value is generated based on a first weight factor and the scratch pad threshold value.

7. The method of claim 6 further comprising:
determining whether a first data unit is the first type,
comparing the scratch pad fullness value with the scratch pad threshold, receiving a first random number if the scratch pad fullness is greater than or equal to the scratch pad threshold,
filtering the first data unit if the first random number is greater than the first threshold value, and
storing the first data unit in the scratch pad if the first random number is not greater than the first threshold value.

8. The method of claim 5, wherein second threshold value is generated based on a second weight factor and a scratch pad threshold value.

9. The method of claim 8 further comprising:
determining whether a second data unit is the second type,
comparing the scratch pad fullness value with the scratch pad threshold,
receiving a second random number in response to sending a second signal if the scratch pad fullness is greater than or equal to the scratch pad threshold, and
storing the second data unit in the scratch pad if the second random number is less than the second threshold value, and
not storing the second data unit if the second random number is not less than the second threshold value.

10. The method of claim 9 further comprising generating the first random number and the second random number in response to receiving the first signal and a second signal.

11. A non-transitory machine-readable storage medium comprising a plurality of instructions that in response to being executed result in a network processor:
to generate a first threshold value for a first type of exception data units and a second threshold value for a second type of exception data units;
to filter the first type of exception data units to store a first proportion of the first type of exception data units in the scratch pad based on the first threshold value and to filter the second type of exception data units to store a second proportion of the second type of exception data units in the scratch pad based on the second threshold value, and
to determine a scratch pad fullness value based on the second proportion;
wherein the first threshold value and the second threshold value are determined based on respective weight factors of the first type and the second type of exception data units and a scratch pad threshold value, wherein the second proportion is greater than the first proportion and the second type of exception data units are of higher priority compared to the first type of exception data units, wherein the scratch pad is provisioned to selectively allow the first and the second type of exception data units from a regular processing path to a specialized processing path of the network processor.

12. The machine-readable storage medium of claim 11, wherein the first threshold value is generated based on a first weight factor and the scratch pad threshold value.

13. The machine-readable storage medium of claim 12 comprises:
determining whether a first data unit is the first type,
comparing the scratch pad fullness value with the scratch pad threshold,
receiving a first random number in response to sending a first signal if the scratch pad fullness is greater than or equal to the scratch pad threshold, and
filtering the first data unit if the first random number is greater than the first threshold value, and
storing the first data unit in the scratch pad if the first random number is not greater than the first threshold value.

14. The machine-readable storage medium of claim 11, wherein second first threshold value is generated based on a second weight factor and a scratch pad threshold value.

15. The machine-readable storage medium of claim 14 comprises:
determining whether a second data unit is the second type,
comparing the scratch pad fullness value with the scratch pad threshold,
receiving a second random number in response to sending a second signal if the scratch pad fullness is greater than or equal to the scratch pad threshold, and
filtering the second data unit if the second random number is greater than the second threshold value, and
storing the first data unit in the scratch pad if the second random number is not greater than the second threshold value.

16. The machine-readable storage medium of claim 15 further comprises generating the first random number and the second random number in response to receiving the first signal and a second signal.

17. A network device comprising:
a network interface to transfer a first data unit and second data unit;
a memory to store a configuration table and configuration values; and
a network processor to generate a first threshold value for a first type of exception data units and a second threshold value for a second type of exception data units, wherein the first threshold value and the second threshold value are determined based on respective weight factors of the first type and the second type of exception data units and a scratch pad threshold value , and
to filter the first type of exception data units to store a first proportion of the first type of exception data units in the scratch pad based on the first threshold value and to filter the second type of exception data units to store a first proportion of the first type of exception data units in the scratch pad based on the second threshold value,
wherein the second proportion is greater than the first proportion and the second type of exception data units are of higher priority compared to the first type of exception data units, wherein a scratch pad fullness value is determined based on the second proportion, wherein the scratch pad is provisioned to selectively allow the first and the second type of exception data units from a regular processing path to a specialized processing path of the network processor.

18. The network device of claim 17, wherein the network processor generates the first threshold value based on a first weight factor and a scratch pad threshold value, and the second threshold value based on a second weight factor and a scratch pad threshold value.

19. The network device of claim 17 is a router.

20. The network device of claim 19, wherein the router supports a start-up application, which needs to process more of the first type of exception data units as compared to the second type of exception data units.

* * * * *